（12）United States Patent
Murzyn et al.

(10) Patent No.: US 11,131,884 B2
(45) Date of Patent: Sep. 28, 2021

(54) DISPLAY SYSTEM (71) Applicant: Visteon Global Technologies, Inc., Van Buren Township, MI (US)

(72) Inventors: Pawel Murzyn, Chelmsford (GB); Steven Purcell, Essex (GB); Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/833,256

(22) Filed: Mar. 27, 2020

(65) Prior Publication Data
US 2020/0319512 A1 Oct. 8, 2020

Related U.S. Application Data (60) Provisional application No. 62/828,167, filed on Apr. 2, 2019.

(51) Int. Cl.
*G02F 1/13357* (2006.01)
*G09G 3/34* (2006.01)
(Continued)

(52) U.S. Cl.
CPC ........ *G02F 1/133606* (2013.01); *B60K 35/00* (2013.01); *G02F 1/1323* (2013.01);
(Continued)

(58) Field of Classification Search
CPC .................. G09G 3/3426; G09G 3/36; G09G 3/3406–3426; G02F 1/1336–133613; B60K 35/00; B60K 2370/152–1537
See application file for complete search history.

(56) References Cited

U.S. PATENT DOCUMENTS 5,877,829 A * 3/1999 Okamoto .......... G02F 1/133602 349/74
6,211,930 B1 * 4/2001 Sautter ................ G02F 1/13476 349/66
(Continued)

FOREIGN PATENT DOCUMENTS

GB       2418518 A    *  3/2006  ......... G02F 1/13475
WO  WO-2011143211 A2  * 11/2011  ........... H04N 13/351
WO  WO-2018185476 A1  * 10/2018  ....... G02F 1/133603

*Primary Examiner* — Mariceli Santiago
(74) *Attorney, Agent, or Firm* — Quinn IP Law (57) ABSTRACT A display with local dimming backlight and an active privacy mode. The display may include a backlight source, lenses, a passive diffuser, an active diffuser and a transmissive display. The backlight source may define a two-dimensional matrix of light sources configured to generate an initial light. The lenses may be mounted adjacent to the backlight source, aligned with the light sources, and configured to generate a collimated light. The passive diffuser may be mounted adjacent to the lenses and configured to spatially spread the collimated light. The active diffuser may be mounted adjacent to the passive diffuser, configured to generate an intermediate light in response to the collimated light, and configured to change a diffusive property of the intermediate light in response to a scattering signal. The transmissive display may be mounted adjacent to the active diffuser and configured to generate multiple visible images by modulating the intermediate light.

20 Claims, 6 Drawing Sheets (51) Int. Cl.
*G09G 3/36* (2006.01)
*G02F 1/1334* (2006.01)
*B60K 35/00* (2006.01)
*G02F 1/13* (2006.01)
*G02F 1/1335* (2006.01)

(52) U.S. Cl.
CPC ...... *G02F 1/1334* (2013.01); *G02F 1/133603* (2013.01); *G09G 3/3426* (2013.01); *G09G 3/36* (2013.01); *B60K 2370/152* (2019.05); *B60K 2370/52* (2019.05); *G02F 1/133607* (2021.01); *G09G 2320/0233* (2013.01); *G09G 2320/0646* (2013.01)

(56) References Cited

U.S. PATENT DOCUMENTS

| | | | |
|---|---|---|---|
| 7,948,580 B2* | 5/2011 | Sakai | G02F 1/1347 349/64 |
| 2020/0026114 A1* | 1/2020 | Harrold | G02F 1/13439 |

* cited by examiner

DISPLAY SYSTEM

CROSS-REFERENCE TO RELATED APPLICATIONS

This application claims the benefit of U.S. Provisional Application No. 62/828,167, filed Apr. 2, 2019, which is hereby incorporated by reference in its entirety.

TECHNICAL FIELD

The present disclosure generally relates to visibility of electronic displays, and in particular to displays with local dimming backlight displays with an active privacy mode.

BACKGROUND

Console-based displays are becoming more popular in automobiles. The displays are commonly intended for use by a driver of the automobile and a passenger sitting next to the driver. With an availability of video sources and Internet content within the automobiles, conflicts have been created between the drivers and the passengers for what content to present on the displays.

SUMMARY

This section provides a general summary of the disclosure and is not a comprehensive disclosure of its full scope or all of its features, aspects or objectives.

A display with local dimming backlight and an active privacy mode is provided herein. The display may include a backlight source, a plurality of lenses, a passive diffuser, an active diffuser and a transmissive display. The backlight source may define a two-dimensional matrix of a plurality of light sources and is configured to generate an initial light. The plurality of lenses may be mounted adjacent to the backlight source, aligned with the plurality of light sources and are configured to generate a collimated light by redirecting the initial light. The passive diffuser may be mounted adjacent to the lenses and is configured to spatially spread the collimated light.

The active diffuser may be mounted adjacent to the passive diffuser, is configured to generate an intermediate light in response to the collimated light and is configured to change a diffusive property of the intermediate light between a scattering state in a public viewing mode and a non-scattering state in a private viewing mode in response to a scattering signal. The transmissive display may be mounted adjacent to the active diffuser and is configured to generate a plurality of visible images by modulating the intermediate light.

An instrument panel is provided herein. The instrument panel may include a controller circuit and a plurality of displays. The controller circuit may be configured to generate a brightness signal, a scatter control signal and a display signal. The plurality of displays may be in electrical communication with the controller circuit. One or more of the plurality of displays may include a backlight source, a plurality of lenses, a passive diffuser, an active diffuser and a transmissive display. The backlight source may define a two-dimensional matrix of a plurality of light sources and is configured to generate an initial light in response to the brightness signal. The plurality of lenses may be mounted adjacent to the backlight source, aligned with the plurality of light sources and are configured to generate a collimated light by redirecting the initial light. The passive diffuser may be mounted adjacent to the lenses and is configured to spatially spread the collimated light.

The active diffuser may be mounted adjacent to the passive diffuser, is configured to generate an intermediate light in response to the collimated light and is configured to change a diffusive property of the intermediate light between a scattering state in a public viewing mode and a non-scattering state in a private viewing mode in response to the scatter control signal. The transmissive display may be mounted adjacent to the active diffuser and is configured to generate a plurality of visible images by modulating the intermediate light in response to the display signal.

A non-transitory computer readable medium is provided herein. The non-transitory computer readable medium has recorded instructions executable by a processor for control of a display. Execution of the instructions may cause a processor to control a backlight source configured to generate an initial light. The backlight source may define a two-dimensional matrix of a plurality of light sources. A plurality of lenses may be mounted adjacent to the backlight source, aligned with the plurality of light sources and are configured to generate a collimated light by redirecting the initial light. A passive diffuser may be mounted adjacent to the lenses and is configured to spatially spread the collimated light.

Execution of the instructions may cause the processor to control an active diffuser that is configured to change a diffusive property of an intermediate light between a scattering state in a public viewing mode and a non-scattering state in a private viewing mode. The active diffuser may be mounted adjacent to the passive diffuser and is configured to generate the intermediate light in response to the collimated light. Execution of the instructions may also cause the processor to control a transmissive display that is configured to generate a plurality of visible images by modulating the intermediate light. The transmissive display may be mounted adjacent to the active diffuser.

Further objects, features and advantages of the present teaching will become readily apparent to persons skilled in the art after a review of the following description, with reference to the drawings that are appended to and form a part of this specification.

DETAILED DESCRIPTION

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure.

Embodiments may include a display configured to generate a display signal conveying a plurality of images. The display signal may be transitioned between a private viewing mode of operation and a public viewing mode of operation. In various embodiments, the transition may be a discrete step between the private viewing mode and the public viewing mode. In other embodiments, the transition may be continuous between the private viewing mode and the public viewing mode. In the private viewing mode of operation, the display signal may have a narrow viewing range limited to a few tens of degrees (e.g., ±25 degrees) from a normal line incident to a surface of the display. In the public viewing mode of operation, the display signal may have a wide viewing range (e.g., ±60 degrees) about the normal line incident to the surface of the display.

The display may utilize a highly collimated backlight source to provide illumination for a transmissive display. An electrically switchable active diffuser may be situated between the backlight source and the transmissive display. The active diffuser may introduce a switchable diffusion layer that provides variable degrees of scattering between an active scattering state to a non-scattering state of the collimated light produced by the backlight source. The active diffuser may be divided into multiple independently defined zones (or segments). Each zone may be independently controllable between the public viewing mode and the private viewing mode. For each zone in the public viewing mode of operation, the active diffuser may provide active scattering of the collimated light used for public (e.g., wide angle) viewing of the transmissive display. For each zone in the private viewing mode of operation, the active diffuser may provide little to no scattering of the collimated light resulting in a private (e.g., narrow angle) viewing of the transmissive display.

The collimated backlight source is generally based on a two-dimensional matrix (or array) of light sources and a corresponding two-dimensional matrix (or array) of lenses that provide zones with sharp luminance cut-off. The sharp luminance cut-off allows for implementing local dimming. Luminance of the matrix of light sources within the backlight source are generally controllable in multiple independently defined zones (or segments). In various embodiments, each zone of the collimated backlight source may be spatially aligned with a corresponding zone in the active diffuser. Other relationships of zones in the collimated backlight source to the zones in the active diffuser may be implemented to meet the design criteria of a particular application.

Each defined zone may be adjusted to a different brightness level. Due to the collimation of the light produced by the backlight source, one or more of the zones may be operated in the private viewing mode and/or the public viewing mode at a user selectable brightness level. For example, zones of the backlight source corresponding to areas on the display that should be black may be switched off to create a high dynamic range in the visible images. In various embodiments, the display may provide for contrast ratios of up to 15,000:1.

Figure 1:
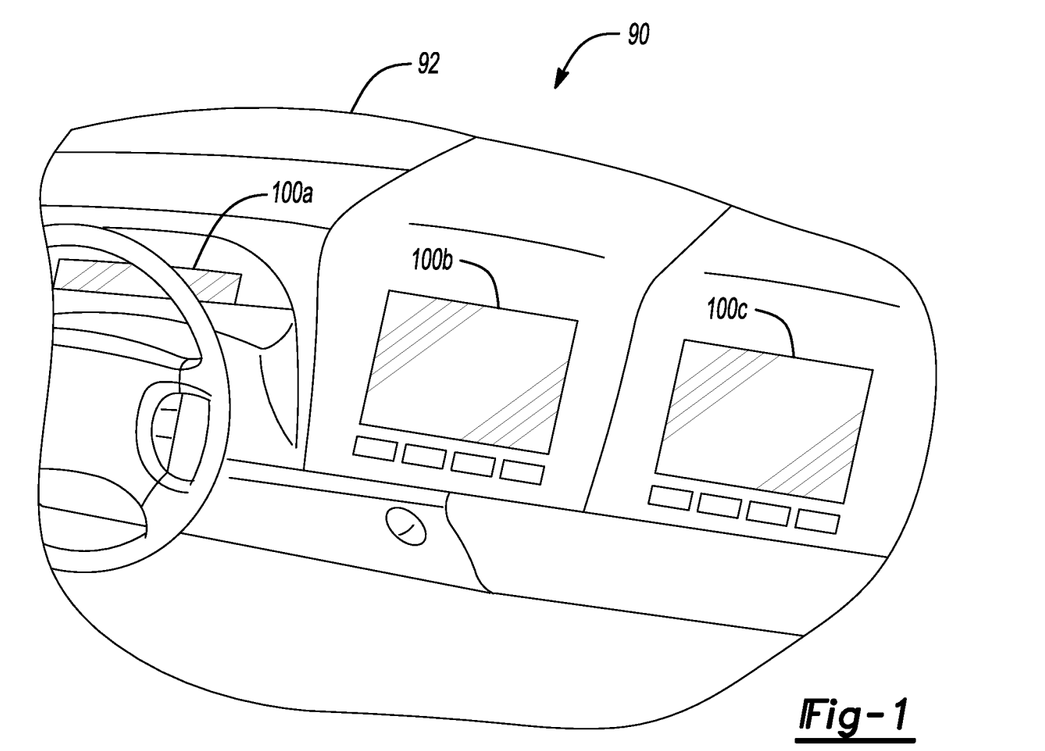
FIG. 1 illustrates a context of a platform.

FIG. 1 illustrates a context of a platform 90. The platform 90 generally includes a body 92 and multiple displays 100a-100c. The body 92 may implement a body of a vehicle. The vehicle may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of platforms 90 may be implemented to meet the design criteria of a particular application.

The displays 100a-100c are generally mounted to the body 92. In various embodiments, one or more of the displays 100a-100c may be disposed inside the platform (e.g., vehicle) 90. In other embodiments, one or more of the displays 100a-100c may be disposed exterior to the platform 90. One or more of the displays 100a-100c may implement a local dimming backlight capability. One or more of the displays 100a-100c may also implement an active privacy mode. As illustrated, the display 100a may be a cluster display positioned for use by a driver. The display 100b may be a console display positioned for use by the driver and a passenger. The display 100c may be a passenger display positioned for use by the passenger.

Figure 2:
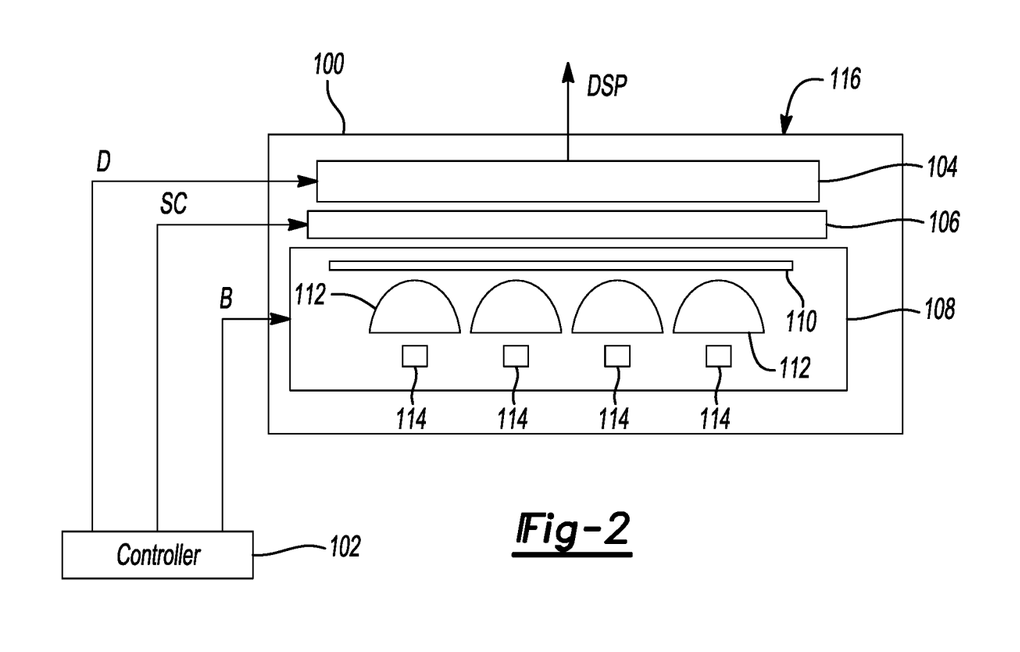
FIG. 2 illustrates a schematic diagram of a display in accordance with one or more embodiments of the platform.

FIG. 2 illustrates a schematic diagram of an implementation of a display 100 in accordance with one or more embodiments of the platform 90. In some embodiments, the display 100 may be representative of the displays 100a-100c. In different embodiments, the display 100 may be representative of the display 100a and/or the display 100c. In some cases, the display 100b may implement the local dimming functionality without the active private viewing mode. In other cases, the display 100b may be a standard display. The display 100 may be electrically connected to a controller circuit 102. The display 100 generally comprises a transmissive display 104, an active diffuser 106 and a backlight source 108. The backlight source 108 may include a passive diffuser 110, lenses 112 and light sources 114. An optical signal (e.g., DSP) may be presented from a surface 116 of the display 100. The optical signal DSP may be an optical signal that carries multiple visible images. The visible images may include words, number, pictures, graphical shapes, video and information related to the platform 90 (e.g., radio, entertainment, climate control, etc.).

A display signal (e.g., D) may be generated by the controller circuit 102 and received by the transmissive display 104. The display signal D may carry information used by the transmissive display 104 to modulate the optical signal DSP. A scatter control signal (e.g., SC) may be generated by the controller circuit 102 and presented to the active diffuser 106. The scatter control signal SC may carry control information used by the active diffuser 106 to scatter/not scatter light in the various zones. The controller circuit 102 may also generate a brightness signal (e.g., B) received by the light sources 114. The brightness signal B may convey brightness information used to control the luminance of the light sources 114 in the various zones.

The controller circuit 102 may implement an electronic control unit. The controller circuit 102 is generally operational to generate the display information in the display signal D. The controller circuit 102 may also be operational to generate the control information in the scatter control signal SC. The controller circuit 102 may generate and present the brightness information in the brightness signal B. In various embodiments, a separate controller circuit 102 may be implemented for each display 100a-100c. In some designs, a single controller circuit 102 may be operational to simultaneously control two or more displays 100a-100c.

The display signal D may be configured to provide instrumentation (e.g. speed, tachometer, fuel, temperature, etc.) to the display 100. In some embodiments, the control signals may also be configured to provide video (e.g., a rear-view camera video, a forward-view camera video, an on-board DVD player, etc.) to the display 100. In other embodiments, the control signals may be further configured to provide alphanumeric information shown on the display 100.

In various embodiments, the controller circuit 102 generally comprises one or more microcontrollers. Each microcontroller may include one or more processors, each of which may be embodied as a separate processor, an application specific integrated circuit (ASIC), a field programmable gate array (FPGA), or a dedicated electronic control unit.

The microcontrollers may be any sort of electronic processor (implemented in hardware, software executing on hardware, or a combination of both). The microcontrollers may also include tangible, non-transitory memory, (e.g., read only memory in the form of optical, magnetic, and/or flash memory). For example, the microcontrollers may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present disclosure may be stored in the memory and executed as set forth herein. The executable instructions may be a series of instructions employed to run applications on the microcontrollers (either in the foreground or background). The microcontrollers may receive commands and information, in the form of one or more input signals from various controls or components in the platform 90, and communicate instructions to the display 100 through one or more control signals transferred to the display 100.

The transmissive display 104 may implement a display panel that modulates an intermediate light as the light passes through from one side of the transmissive display 104 to the other side. The transmissive display 104 may be a color transmissive display or a black-and-white transmissive display. The transmissive display 104 may be mounted adjacent to (or adjoining) the active diffuser 106. The transmissive display 104 is generally operational to change opaqueness in different areas in response to the display signal D. The changes in opaqueness generally modulate the intensity and the color to generate the optical signal DSP. The modulated light may form the images in the optical signal DSP. In various embodiments, the transmissive display 104 may be implemented as a thin-film transistor (TFT) liquid crystal display (LCD) or a passive liquid crystal display. Other transmissive display technologies may be implemented to meet the design criteria of a particular application.

The active diffuser 106 may implement a polymer-dispersed liquid-crystal (PDLC) display. The active diffuser 106 may be mounted adjacent to (or adjoining) the passive diffuser 110. The active diffuser 106 is generally operational to change the diffusion in each zone in response to the scatter control signal SC. While the active diffuser 106 is in an "off" state (or scattered state), incident light may be scattered thereby providing the intermediate light to the transmissive display 104 in the public viewing mode or public mode (e.g., wide viewing angle). While the active diffuser 106 is in an "on" state (or non-scattered state), the incident light may not be scattered thereby providing intermediate light to the transmissive display 104 in the private viewing mode or private mode (e.g., narrow viewing angle).

The backlight source 108 may implement a highly collimated source of light used to backlight the active diffuser 106 and the transmissive display 104. The backlight source 108 may be mounted to the body 92. In various embodiments, the backlight source 108 may be divided into multiple zones, where a brightness of each zone is independently controllable by the brightness signal B. In some embodiments, the backlight source 108 may implement a single zone, where the brightness across an area of the backlight source 108 is uniformly controllable by the brightness signal B. The collimated light may be presented to the active diffuser 106.

The passive diffuser 110 may implement a spatial diffuser. The passive diffuser 110 may be mounted adjacent to (or adjoining) the lenses 112. The passive diffuser 110 is generally operational to spatially diffuse the collimated light received from the lenses. The spatial diffusion may smooth variations in the intensity of the collimated light received from the lenses 112.

The lenses 112 may implement a two-dimensional matrix (or array) of lenses. The lenses 112 may be mounted adjacent to (or neighboring) the light sources 114. The lenses 112 are generally operational to collimate the initial light generated by the light sources 114 of the backlight source 108. In various embodiments, an individual lens 112 may be provide for and optically aligned with an individual light source 114. In other embodiments, each lens 112 may be provided for and optically aligned with multiple (e.g., four) elements of the light sources 114. The collimated initial light may be directed to the passive diffuser 110.

The light sources 114 may implement a two-dimensional matrix (or array) of light sources. The light sources 114 may be mounted to the body 92. Each element of the light sources 114 may be implemented as a light emitting diode (LED). The light sources 114 are generally operational to generate (or emit) the initial light used to create the optical signal DSP. In various embodiments, the light sources 114 may be arranged in the multiple zones, where a brightness of each zone is independently controllable by the brightness signal B. In some embodiments, the light sources 114 may be arranged in a single zone, where the brightness across the area of the backlight source 108 is uniformly controllable by the brightness signal B. The initial light may be presented to the lenses 112.

Figure 3:
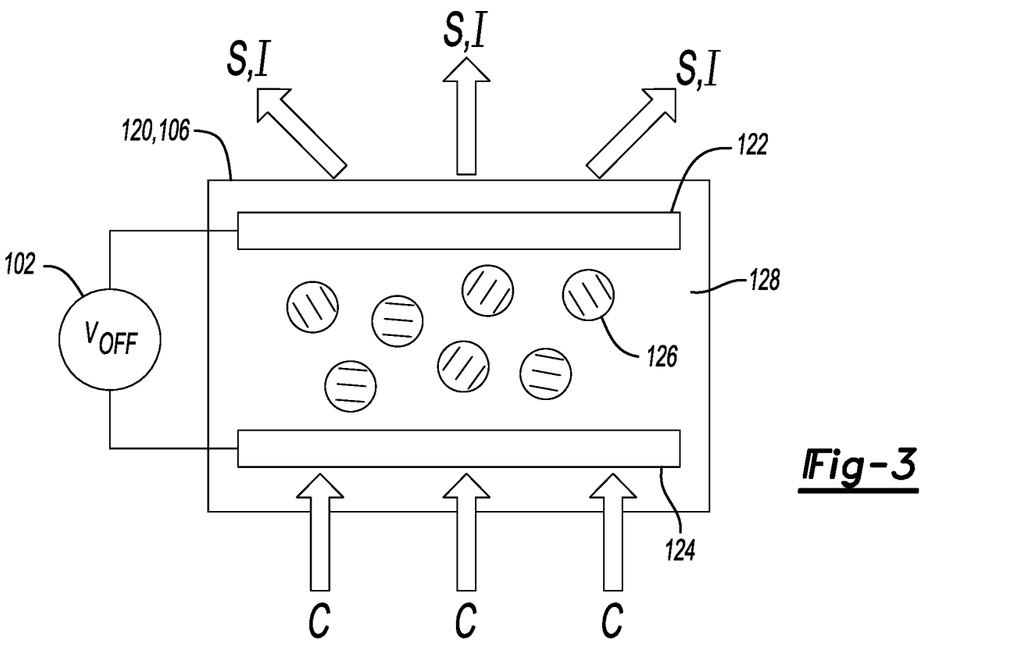
FIG. 3 illustrates a schematic diagram of a zone in an active diffuser of the display in a scattered state in accordance with one or more embodiments of the platform.

FIG. 3 illustrates a schematic diagram of a zone 120 in the active diffuser 106 in the scattered state in accordance with one or more embodiments of the platform 90. The active diffuser 106 generally comprises a first plate 122, a second plate 124 and multiple liquid crystals 126. The collimated light (e.g., C) may be received at the second plate 124 from the lenses 112. A scattered light (e.g., S) may be presented from the first plate 122 to the transmissive display 104. The scattered light S may form the intermediate light (e.g., I) while the active diffuser 106 is in the scattered state. An example of how the active diffuser 106 may scatter light may be simulated with a passive diffuser film mounted in front of a collimated light source. The passive diffuser film may be a 100SXE single sided passive diffusion film available from Kimoto Ltd. in Zurich, Switzerland.

The first plate 122 and the second plate 124 may each implement a transparent and electrically conductive layer (or film). The first plate 122 may be parallel to the second plate 124 with a slight separation. The scatter control signal SC may convey a voltage applied across the first plate 122 and the second plate 124. An electrical field may be created between the first plate 122 and the second plate 124 in response to the applied voltage received from the controller circuit 102.

The liquid crystals 126 may be electric-field-sensitive droplets dispersed in a polymer 128. The liquid crystals 126 may be dissolved or dispersed into a liquid version of the polymer 128 followed by solidification or curing of the polymer 128 between the first plate 122 and the second plate 124. As the polymer 128 cures, the liquid crystals 126 generally become incompatible with the polymer 128 in solid form and thus form the droplets. An orientation of the liquid crystals 126 may be controlled by the electric field. The liquid crystals 126 may selectively scatter or pass the collimated light C depending on how the collimated light C is aligned with the liquid crystals 126.

In the embodiment illustrated in FIG. 3, the scatter control signal SC is in the "off" state (e.g., a zero voltage or low voltage) and so the electric field across the first plate 122 and the second plate 124 may be absent or small. In the absence of the electric field, the liquid crystals 126 may have random orientations. The random orientations may scatter the collimated light C to create the scatter light S. The scattered light S may depart from the first plate 122 at angles of up to ±60 degrees relative to a normal line perpendicular to a plane of the first plate 122.

Figure 4:
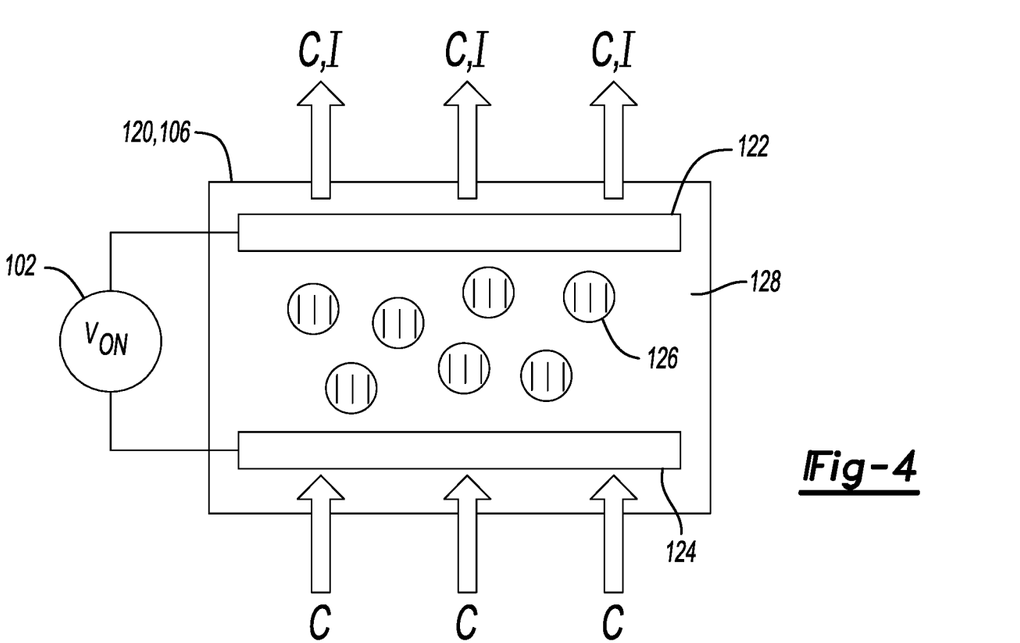
FIG. 4 illustrates a schematic diagram of the zone in the active diffuser in a non-scattered state in accordance with one or more embodiments of the platform.

FIG. 4 illustrates a schematic diagram of the zone 120 in the active diffuser 106 in the non-scattered state in accordance with one or more embodiments of the platform 90. The collimated light C may be received at the second plate 124 from the lenses 112. The collimated light C may be presented from the first plate 122 to the transmissive display 104. The collimated light C may be transformed into the intermediate light I while the active diffuser 106 in the scattered state. While the scatter control signal SC is in the "on" state (e.g., a high voltage), the electric field across the first plate 122 and the second plate 124 may be sufficient to reorient the liquid crystals 126. In the presence of the electric field, the liquid crystals 126 may be orientated perpendicular to the planes of the first plate 122 and the second plate 124. The liquid crystals 126 may also be aligned with the collimated light C. The perpendicular orientations may pass the collimated light C with little to no scattering. The collimated light C may depart from the first plate 122 at angles of up to ±25 degrees relative to the normal line perpendicular to the plane of the first plate 122.

In other embodiments, the scatter control signal SC may apply a voltage to cause scattering (e.g., where the active diffuser 106 is implemented as a reverse-type polymer-dispersed liquid crystal (R-PDLC) display). When the voltage is removed from the scatter control signal SC, the R-PDLC type of active diffuser 106 may not scatter the collimated light C. Other types of liquid crystal modes and/or other types of scatter control signals SC may be implemented to meet the design criteria of a particular application.

Figure 5:
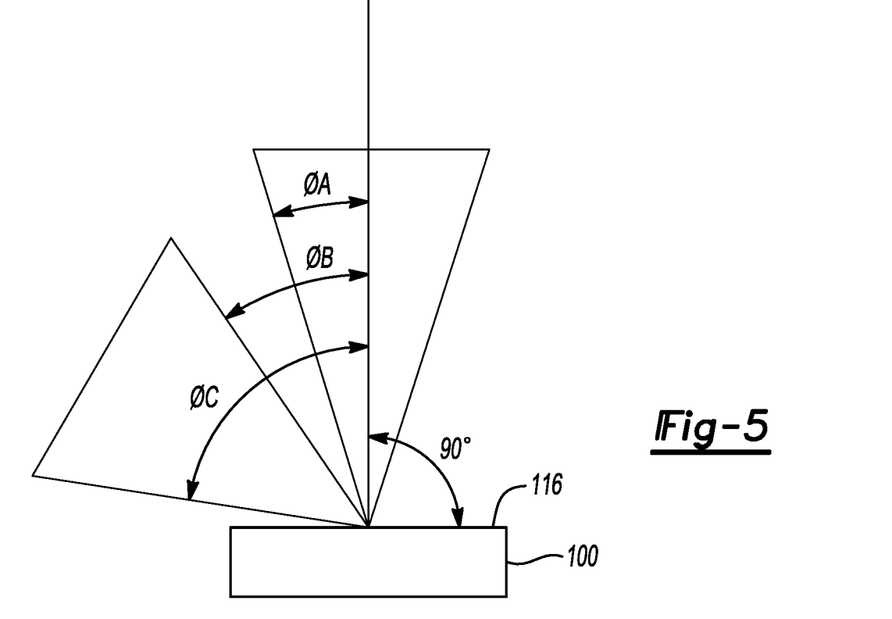
FIG. 5 illustrates a schematic diagram of a side view of the display in accordance with one or more embodiments of the platform.

FIG. 5 illustrates a schematic diagram of a side view of the display 100 in accordance with one or more embodiments of the platform 90. While the display 100 is operated in the private viewing mode, the optical signal DSP may be presented in a narrow field of view about a normal line (e.g., N) perpendicular to the surface 116 of the display 100. The narrow field of view may provide a person with optimal picture quality and luminance. The narrow field of view may be within a narrow angle (e.g., φA). In various embodiments, the narrow angle φA may be approximately 25 degrees from the normal line N. The private viewing mode on the display 100c may be useful for displaying information such as videos and Internet content to the person (e.g., the passenger). The private viewing mode on the display 100a may be useful for displaying information such as speed, fuel levels, engine temperature and the like to a person (e.g., the driver).

An intermediate angle (e.g., (φB) is generally defined outside the narrow angle ΦA. The intermediate angle φB may establish a practical limit of a blocking range for another person (e.g., the driver for the display 100c and the passenger for the display 100a). At the intermediate angle φB and higher angles, the luminance of the optical signal DSP may be near zero, a contrast ratio of the optical signal DSP may be near zero, and so no visible pictures may be seen by the other person. In various embodiments, the intermediate angle φB may be approximately 40 degrees from the normal line N.

In the range between the narrow angle φA and the intermediate angle φB, the optical signal DSP may be visible by the other person, depending on the viewing angle. The closer the viewing angle is to the narrow angle φA, the brighter the optical signal DSP. The closer the viewing angle is to the intermediate angle φB, the dimmer the optical signal DSP.

While the display 100 is operated in the public viewing mode, the optical signal DSP may be presented in a wide field of view about the normal line N perpendicular to the surface 116 of the display 100. The wide field of view may be within a wide angle (e.g., φC). In various embodiments, the wide angle φC may be approximately 60 degrees from the normal line N. The wide angle φC generally allows both people (e.g., the driver and the passenger) to clearly see the optical signal DSP. The public viewing mode may be useful for displaying information such as climate control, radio and similar automotive content to both people. The wide angle φC may provide a sharp contrast ratio (e.g., >800:1) making the visual images suitable for reading.

Since the active diffuser 106 may be divided into independent zones, the different zones may be designed and driven in a segmented fashion. As an example, the left size of the display 100c may be configured in the public viewing mode while the right side of the display 100c may be configured in the private viewing mode. Given a wide (e.g., 8:3) aspect ratio of some implementations of the display 100c that may be used as the passenger display, a 16:9 video may occupy a portion of an active area of the display 100c. The video may be shown to the passenger in the private viewing mode. The other portion of the display 100c may be made public as so visible to the driver. Likewise, different zones of the display 100a may be configured differently. For example, a portion of the display 100a may be operated in the public viewing mode so that the passenger may see some information. A remainder of the display 100a may be operated in the private viewing mode for the sake of the driver. Where implemented with the active privacy mode, the display 100*b* may have some portions (zones) in the private viewing mode and other portions (zones) in the public viewing mode.

Figure 6:
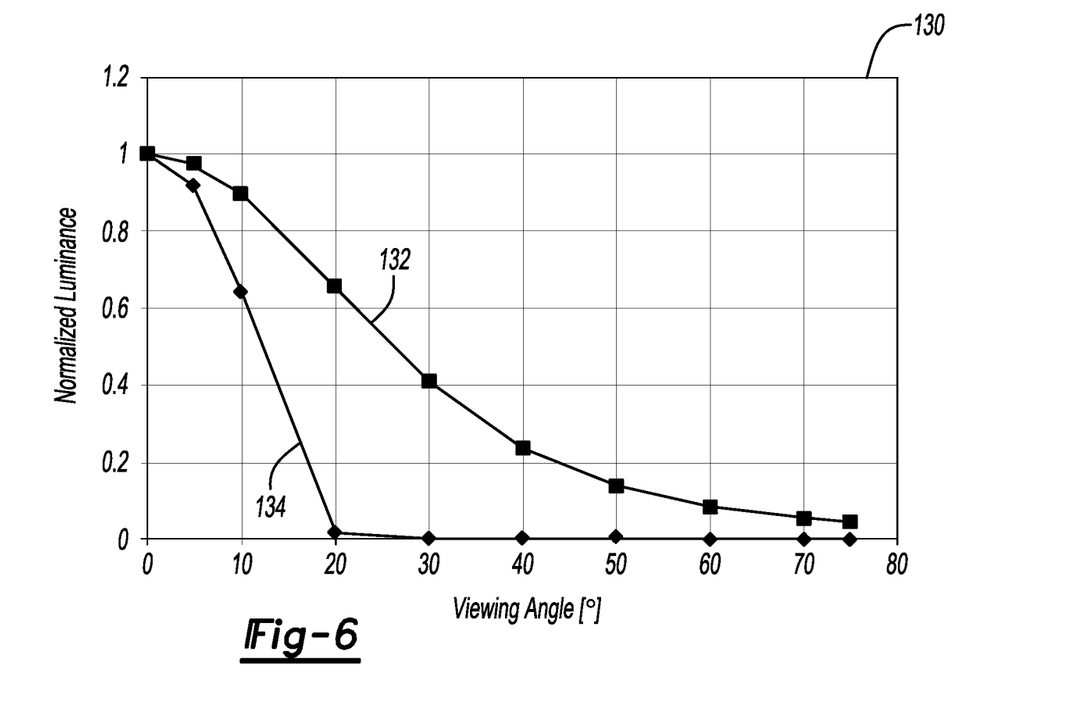
FIG. 6 illustrates a graph of a normalized luminance versus a viewing angle of the display in accordance with one or more embodiments of the platform.

FIG. 6 illustrates a graph 130 of a normalized luminance versus a viewing angle of the display 100 in accordance with one or more embodiments of the platform 90. The luminance axis (e.g., y axis) of the graph 130 may show a visible luminance normalized to a maximum luminance along the normal line N. The viewing angle axis (e.g., x axis) generally shows the viewing angle in degrees.

A curve 134 generally illustrates the normalized luminance in the private viewing mode. At a zero-degree viewing angle (e.g., along the normal line N perpendicular to the surface 116 of the display 100), the luminance may be unity. The curve 134 may decline as the viewing angle increases. At an approximately 20 degrees to 25 degrees viewing angle, the normalized luminance may drop below 0.04 (e.g., 4 percent) of unity. At higher viewing angles, the attenuation may increase from approximately 96 percent to nearly 100 percent.

A curve 132 generally illustrates the normalized luminance in the public viewing mode. As the zero-degree viewing angle, the luminance may be unity. The curve 132 may decline gradually as the viewing angle increases. At an approximately 60 degrees to 65 degrees viewing angle, the normalized luminance may drop to approximately 0.1 (e.g., 10 percent) of unity. At higher viewing angles, the attenuation may increase from approximately 90 percent to 96 percent and greater.

Figure 7:
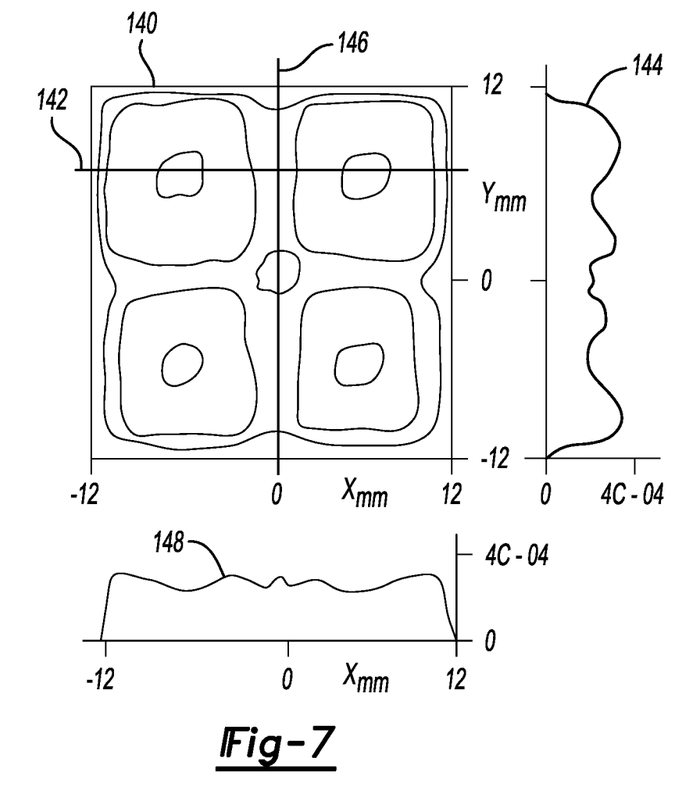
FIG. 7 illustrates a simulated illuminance performance of a 2×2 matrix zone of a backlight source before a passive diffuser of the display as a function of spatial location in accordance with one or more embodiments of the platform.

FIG. 7 illustrates a simulated illuminance performance of a 2×2 matrix zone of the backlight source 108 before the passive diffuser 110 as a function of spatial location in accordance with one or more embodiments of the platform 90. The backlight source 108 may have a depth of approximately 12 millimeters (mm) The 2×2 matrix zone may be 25 mm along an x axis and 25 mm along a y axis. A line 142 may represent a measurement parallel to the x axis at approximately +6 mm along the y axis. A curve 144 illustrates the luminance as measured along the line 142. A line 146 may represent a measurement parallel to the y axis at approximately 0 mm (center of the matrix) along the x axis. A curve 148 illustrates the luminance as measures along the line 146. The curves 144 and 148 generally show a non-uniformity for the spatial luminance of the collimated light C. Other sizes of the zones may be implemented to meet the design criteria of a particular application.

Figure 8:
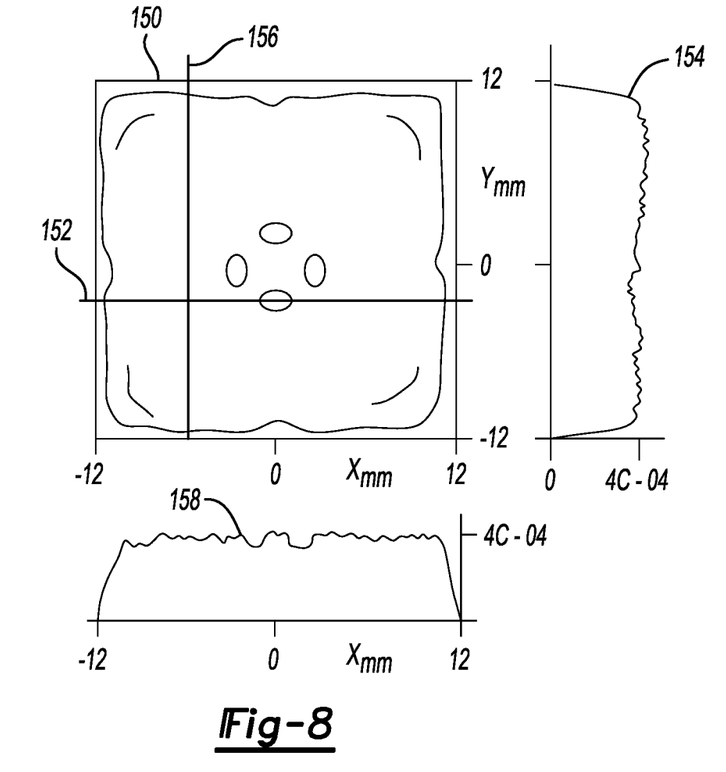
FIG. 8 illustrates a simulated illuminance performance of the 2×2 matrix zone of the backlight source after the passive diffuser as a function of spatial location in accordance with one or more embodiments of the platform.

FIG. 8 illustrates a simulated illuminance performance of the 2×2 matrix zone of the backlight source 108 after the passive diffuser 110 as a function of spatial location in accordance with one or more embodiments of the platform 90. A line 152 may represent a measurement parallel to the x axis at approximately −2 mm along the y axis. A curve 154 illustrates the luminance as measured along the line 152. A line 156 may represent a measurement parallel to the y axis at approximately −3 mm along the x axis. A curve 158 illustrates the luminance as measures along the line 156. The curves 154 and 158 may illustrate a greater spatial uniformity in the luminance of the collimated light C than the curves 144 and 148 due to the passive diffuser 110.

Figure 9:
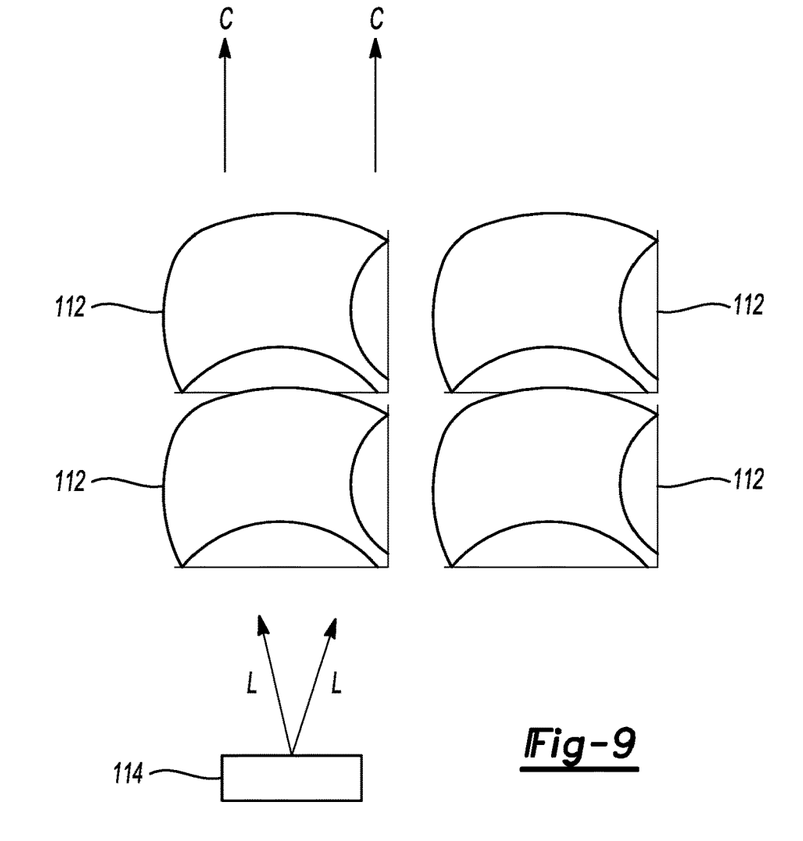
FIG. 9 illustrates an implementation of the 2×2 matrix zone of lenses and a light source of the display in accordance with one or more embodiments of the platform.

FIG. 9 illustrates an implementation of the 2×2 matrix zone in the lenses 112 and the light sources 114 in accordance with one or more embodiments of the platform 90. The light sources 114 (one light source 114 shown) generally create the initial light (e.g., L). The initial light L may be non-collimated light. The lenses 112 may be configured to redirect the initial light L to create the collimated light C. Use of the light sources 114 adjoining the lenses 112 may result in less space occupied around a periphery of the display 100 commonly occupied by edge illumination sources.

Figure 10:
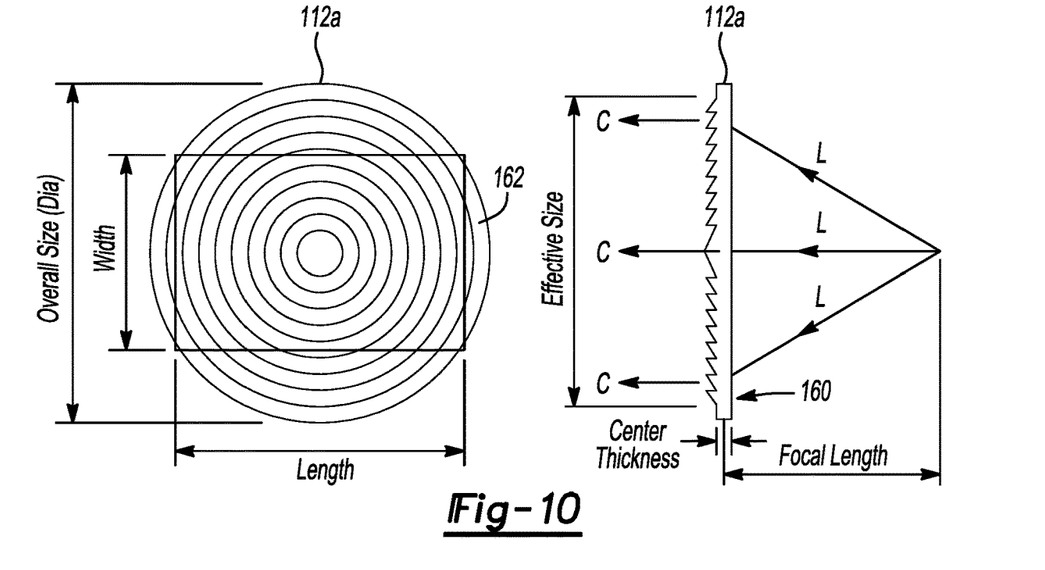
FIG. 10 illustrates a lens in accordance with one or more embodiments of the platform.

FIG. 10 illustrates a lens 112*a* in accordance with one or more embodiments of the platform 90. The lens 112*a* may be representative of the lenses 112 shown in FIG. 2 and FIG. 9. The lens 112*a* may implement a Fresnel type of lens. In some embodiments, the lens 112*a* may be a spherical Fresnel lens. In other embodiments, the lens 112*a* may be a prism-based Fresnel lens. The initial light L emitted by the light sources 114 may be received at a flat surface 160 of the lens 112*a*. An opposite surface 162 of the lens 112*a* may emit the collimated light C.

Figure 11:
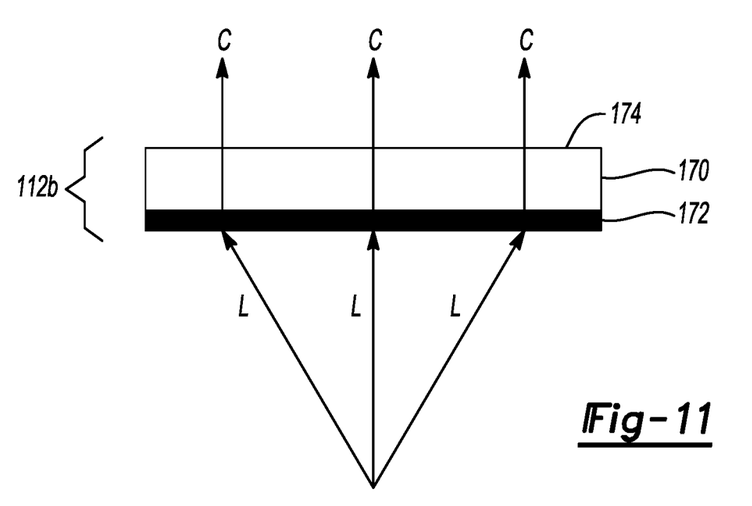
FIG. 11 illustrates another lens in accordance with one or more embodiments of the platform.

FIG. 11 illustrates another lens 112*b* in accordance with one or more embodiments of the platform 90. The lens 112*b* may be representative of the lenses 112 shown in FIG. 2 and FIG. 9. The lens 112*b* may implement a diffractive optical elements (DOE) lens. The lens 112*b* generally comprises a substrate 170, an active phase layer 172, and an anti-reflection (AR) coating 174. The active phase layer 172 may be disposed on a side of the substrate 170 facing the light sources 114. The anti-reflection coating 174 may be disposed on the substrate 170 on a side opposite that of the active phase layer 172.

The active phase layer 172 may receive the initial light L from the light sources 114. The anti-reflection coating 174 may present the collimated light C. The lens 112*b* may be optimized at a blue wavelength of the (LED type) light sources 114. The lens 112*b* may help reduce a thickness of the backlight source 108 and may reduce chromatic dispersion.

Thus, the foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure.

The invention claimed is:

1. A display comprising:
   a backlight source defining a two-dimensional matrix of a plurality of light sources, and configured to generate an initial light, wherein a luminance of the initial light is adjustable in a plurality of zones in response to a brightness signal;
   a plurality of lenses mounted adjacent to the backlight source, aligned with the plurality of light sources, and configured to generate a collimated light by redirecting the initial light;
   a passive diffuser mounted adjacent to the lenses, and configured to spatially spread the collimated light;
   an active diffuser mounted adjacent to the passive diffuser, configured to generate an intermediate light in response to the collimated light, and configured to change a diffusive property of the intermediate light between a scattering state in a public viewing mode and a non-scattering state in a private viewing mode in response to a scattering signal; and
   a transmissive display mounted adjacent to the active diffuser, and configured to generate a plurality of visible images by modulating the intermediate light.

2. The display according to claim 1, wherein the non-scattering state in the private viewing mode creates a narrow viewing range of the visible images from a normal line to a surface of the transmissive display to approximately 25 degrees from the normal line.

3. The display according to claim 2, wherein the non-scattering state in the private viewing mode attenuates the luminance of the visible images at an intermediate angle of greater than approximately 40 degrees from the normal line to less than 4 percent relative to the normal line.

4. The display according to claim 1, wherein the scattering state in the public viewing mode creates a wide viewing range of the visible images from a normal line to a surface of the transmissive display to approximately 60 degrees from the normal line.

5. The display according to claim 4, wherein the scattering state of the public viewing mode attenuates the luminance of the visible images at the approximately 60 degrees from the normal line by no greater than 90 percent relative to the normal line.

6. The display according to claim 1, wherein the active diffuser comprises a polymer-dispersed liquid crystal display.

7. The display according to claim 1, wherein each of the plurality of light sources comprises a light emitting diode.

8. The display according to claim 1, wherein the transmissive display comprises a thin-film transistor display or a liquid crystal display.

9. The display according to claim 1, wherein the display is mounted inside a vehicle.

10. An instrument panel comprising:
a controller circuit configured to generate a brightness signal, a scatter control signal and a display signal; and
a plurality of displays in electrical communication with the controller circuit, wherein one or more of the plurality of displays includes:
a backlight source defining a two-dimensional matrix of a plurality of light sources, and configured to generate an initial light in response to the brightness signal, wherein a luminance of the initial light is adjustable in a plurality of zones in response to the brightness signal;
a plurality of lenses mounted adjacent to the backlight source, aligned with the plurality of light sources, and configured to generate a collimated light by redirecting the initial light;
a passive diffuser mounted adjacent to the lenses, and configured to spatially spread the collimated light;
an active diffuser mounted adjacent to the passive diffuser, configured to generate an intermediate light in response to the collimated light, and configured to change a diffusive property of the intermediate light between a scattering state in a public viewing mode and a non-scattering state in a private viewing mode in response to the scatter control signal; and
a transmissive display mounted adjacent to the active diffuser, and configured to generate a plurality of visible images by modulating the intermediate light in response to the display signal.

11. The instrument panel according to claim 10, wherein the non-scattering state in the private viewing mode creates a narrow viewing range of the visible images from a normal line to a surface of the transmissive display to approximately 25 degrees from the normal line.

12. The instrument panel according to claim 11, wherein the non-scattering state in the private viewing mode attenuates the luminance of the visible images at an intermediate angle of greater than approximately 40 degrees from the normal line to less than 4 percent relative to the normal line.

13. The instrument panel according to claim 10, wherein the scattering state in the public viewing mode creates a wide viewing range of the visible images from a normal line to a surface of the transmissive display to approximately 60 degrees from the normal line.

14. The instrument panel according to claim 13, wherein the scattering state of the public viewing mode attenuates the luminance of the visible images at the approximately 60 degrees from the normal line by no greater than 90 percent relative to the normal line.

15. The instrument panel according to claim 10, wherein the active diffuser comprises a polymer-dispersed liquid crystal display.

16. The instrument panel according to claim 10, wherein each of the plurality of light sources comprises a light emitting diode.

17. The instrument panel according to claim 10, wherein the transmissive display comprises a thin-film transistor display or a liquid crystal display.

18. A non-transitory computer readable medium on which is recorded instructions, executable by a processor, for control of a display, wherein execution of the instructions causes the processor to:
control a backlight source configured to generate an initial light, wherein a luminance of the initial light is adjustable in a plurality of zones in response to a brightness signal, the backlight source defines a two-dimensional matrix of a plurality of light sources, a plurality of lenses are mounted adjacent to the backlight source and aligned with the plurality of light sources and are configured to generate a collimated light by redirecting the initial light, and a passive diffuser is mounted adjacent to the lenses and is configured to spatially spread the collimated light;
control an active diffuser configured to change a diffusive property of an intermediate light between a scattering state in a public viewing mode and a non-scattering state in a private viewing mode, wherein the active diffuser is mounted adjacent to the passive diffuser and is configured to generate the intermediate light in response to the collimated light; and
control a transmissive display configured to generate a plurality of visible images by modulating the intermediate light, wherein the transmissive display is mounted adjacent to the active diffuser.

19. The non-transitory computer readable medium according to claim 18, wherein:
the non-scattering state in the private viewing mode creates a narrow viewing range of the visible images from a normal line to a surface of the transmissive display to approximately 25 degrees from the normal line; and
the non-scattering state in the private viewing mode attenuates the luminance of the visible images at an intermediate angle of greater than approximately 40 degrees from the normal line to less than 4 percent relative to the normal line.

20. The non-transitory computer readable medium according to claim 18, wherein:
the scattering state in the public viewing mode creates a wide viewing range of the visible images from a normal line to a surface of the transmissive display to approximately 60 degrees from the normal line; and
the scattering state of the public viewing mode attenuates the luminance of the visible images at the approximately 60 degrees from the normal line by no greater than 90 percent relative to the normal line.

* * * * *